March 24, 1970 S. D. ROGERS 3,502,819

TELEPHONE CALL INDICATOR

Filed Jan. 13, 1967

INVENTOR.
STUART D. ROGERS

BY Naylor & Neal

ATTORNEYS

United States Patent Office 3,502,819
Patented Mar. 24, 1970

3,502,819
TELEPHONE CALL INDICATOR

Stuart D. Rogers, Tiburon, Calif., assignor to Hanna Land Company, Novato, Calif., a corporation of California Filed Jan. 13, 1967, Ser. No. 609,180
Int. Cl. H04m 1/21
U.S. Cl. 179—84 7 Claims

ABSTRACT OF THE DISCLOSURE

A device attachable to a telephone and containing a magnet which moves responsive to a magnetic field generated when the telephone rings. Motion dampening means prevent the magnet from moving before and after the telephone rings.

SUMMARY OF INVENTION

This invention relates to a device which may be mounted adjacent to a telephone and operates to indicate when a telephone has rung. The device is particularly useful to customers of telephone answering services since the device indicates to the customer the desirability of calling the answering service for any messages accumulated during the customer's absence from his phone.

The device is very inexpensive to manufacture and may be made without any electrical parts so that it can be installed easily by unskilled operators, and it avoids conflicts with the statutes relating to wire tapping and the tariffs relating to the attachment of foreign articles to the equipment of the company.

The simplest form of this device as illustrated in the attached drawings includes a pivotally mounted magnet which swings between two positions, and the location of the magnet in one of the two positions indicates the fact that the telephone has rung. While the device can be constructed for the magnet to move other than pivotally, the pivotally mounted magnet is preferred.

In order to prevent the magnet from moving freely and assuming a position dictated solely by the orientation of the earth's magnetic field and adjacent metal parts, the device is provided with motion dampening means which restrains movement of the magnet away from either of its two extreme positions. The motion dampening means may include frictional mounting for the magnet and/or metallic elements in the device which hold the magnet in its extreme positions. Preferably, the motion dampening means includes a single piece of metal so positioned with respect to the magnet that it holds the magnet in one position, the telephone call indicating position, by a force greater than the force with which it holds the magnet in the other position so that the magnet remains in a telephone call indicating position after it has once been disturbed from a preset condition.

Figure 1:
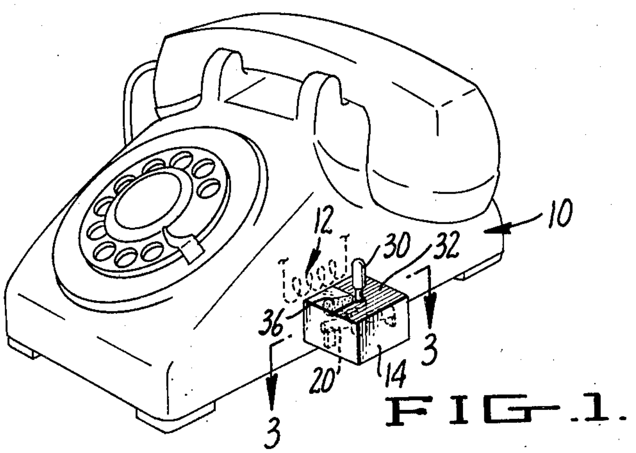
Figure 2:
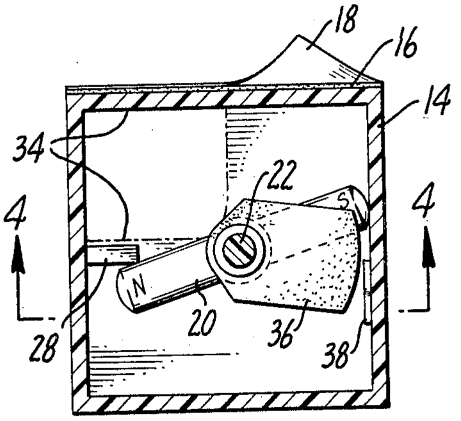
Figure 3:
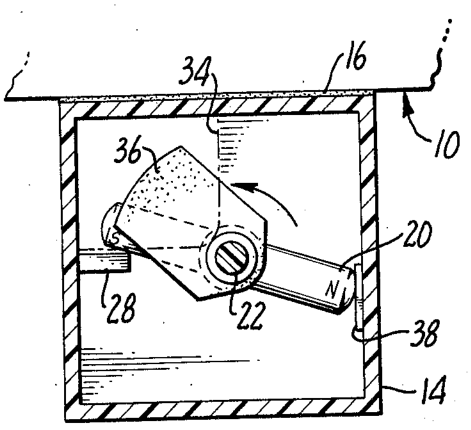
Figure 4:
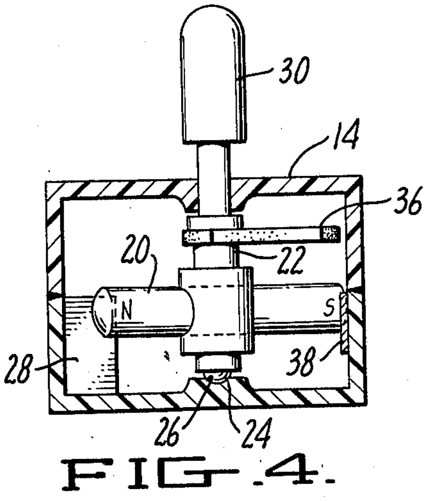

Other features and advantages of the invention will become apparent from the following description read in conjunction with the attached drawings in which:

FIG. 1 is a perspective view of a telephone to which a device constructed in accordance with this invention has been attached;

FIGS. 2 and 3 are horizontal sectional views of the device of FIG. 1 taken along the plane indicated at 3—3 in FIG. 1 with FIGS. 2 and 3 illustrating the rotary magnet in its two extreme positions. The magnet in FIG. 2 is positioned in the preset condition in which the device is set before indicating the receipt of a telephone call, and the magnet in FIG. 3 is in the position to which the magnet moves automatically when the telephone on which the device is mounted rings; and FIG. 4 is a vertical sectional view of the device taken along the plane indicated at 4—4 in FIG. 2.

DETAILED DESCRIPTION

Referring now in detail to the drawing and particularly to FIG. 1, a telephone indicated generally at 10 is illustrated as containing an electrical coil 12. The coil 12 is illustrated only schematically, and depending upon the particular model of telephone to which the device is attached, the coil 12 may be located at different parts of the telephone. The coil 12 is an electrically responsive device which generates a magnetic field to operate a bell, light, or buzzer normally associated with the telephone for indicating when a telephone rings.

The preferred form of the device of this invention includes a plastic body 14 having on one surface thereof a layer of pressure sensitive adhesive 16 by which the device is attached to the telephone with the layer of adhesive 16 normally covered by a layer of removable backing material 18 when the device is sold and prior to the time it is attached to the telephone. The body 14 is attached to the telephone by means of the layer of adhesive 16 in an area through which the magnetic field of the coil 12 passes when the telephone rings.

An elongated magnet 20 mounted on a spindle 22 is pivotally mounted in the body 14 by means of a spherical end 24 on the spindle 22 with the spherical end 24 received in a similarly shaped socket 26 in the bottom of the frame. Preferably the surfaces of the spherical end 24 and socket 26 provide frictional resistance to rotation of the spindle 22, and a spring may also be mounted in the body holding the surfaces together. A stop member 28 is rigidly formed on the inside of the body 14 to limit pivotal movement of the magnet to a pivotal arc of less than 180° as illustrated in FIGS. 2 and 3. The upper end of the spindle 22 extends through the top of the body 14 and is provided with a manipulating handle 30 by which the spindle may be manually rotated between the two positions illustrated in FIGS. 2 and 3.

The top of the body 14 is provided with an opaque shield 32 (see FIG. 1) through which a window 34 is provided, and a red signal member 36 is mounted on the spindle 32 in a position so that it is hidden from view through the window 34 in the position of the device illustrated in FIG. 2 and is exposed in the window 34 in the position of FIG. 2.

A small iron shim 38 is mounted on the inside of the body 14 in a position close to not touching the south pole of the magnet in the position of the device in FIG. 2 with the metal shim 38 positioned closer to the north pole of the magnet 20 in the position of the device in FIG. 3 so that the shim exerts a greater attractive force on the magnet in the FIG. 3 position than in the FIG. 2 position.

The device operates by being manually adjusted to the position illustrated in FIG. 2 where magnetic attraction between the south pole of the magnet 20 and the metal shim 38 holds the magnet in the illustrated position until a magnetic field is generated by the coil 12 in the telephone. When the telephone rings, the magnetic field generated by the coil 12 pulls the south pole of the magnet away from the shim 38 and starts the magnet swinging until magnetic attraction between the north pole and the metal shim pulls the magnet into the position illustrated in FIG. 3. In this position, the appearance of the indicator member 36 through the window 34 indicates that the telephone has rung, and the attraction between the north pole of the magnet 20 and the metal shim 38 holds the device in the position of FIG. 3 until the device is manually reset.

While certain features and advantages of the invention have been described in detail herein, it is obvious that many modifications thereof may be made without departing from the spirit and scope of the invention.

I claim:

1. Apparatus for indicating when a telephone has rung where said telephone generates a magnetic field when it rings, which apparatus comprises:

(A) A frame adapted to be mounted adjacent to a telephone in an area through which said magnetic field passes;

(B) A movable element mounted on said frame for movement between first and second positions;

(C) A body of ferromagnetic material on said movable element positioned in said area through which said magnetic field passes to cause movement of said movable element from said first position to said second position responsive to generation of said magnetic field, and (D) Restraining means for restraining movement of said movable element out of both of said first and second positions.

2. The apparatus of claim 1 in which said restraining means consists of a single means for establishing first and second forces which restrain said movable element in said first and second positions, respectively.

3. The apparatus of claim 1 in which said restraining means consists of a single means for establishing first and second forces which restrain said movable element in said first and second positions, respectively, with said second force substantially exceeding said first force.

4. The apparatus of claim 3 in which said body of ferromagnetic material contains a pair of magnetic poles, and said restraining means comprises at least one piece of ferromagnetic material mounted on said frame at a first distance from one of said magnetic poles in said first position of said movable element and at a second distance, less than said first distance, from one of said magnetic poles in said second position of said movable element.

5. Apparatus for indicating when a telephone has rung where said telephone generates a magnetic field when it rings, which apparatus comprises:

(A) A case having an adhesive surface thereon for attaching said case to a telephone in an area through which said magnetic field passes;

(B) A spindle mounted in said case for pivotal movement about a pivotal axis;

(C) An elongated magnet mounted on said spindle with the length of said magnet extending generally perpendicular to and across said axis;

(D) A stop member in said case positioned to limit pivotal movement of said spindle to a pivotal arc of less than 180°, and (E) Restraining means for restraining pivotal movement of said spindle away from both ends of said pivotal arc.

6. The apparatus of claim 5 in which said restraining means comprises a piece of ferromagnetic material mounted on said case in a position engaging one pole of said magnet when said spindle is positioned at one end of said pivotal arc.

7. Apparatus for indicating when a telephone has rung where said telephone contains a coil which generates a magnetic field when the telephone rings which apparatus comprises:

(A) A frame adapted to be mounted adjacent to a telephone in an area through which said magnetic field passes;

(B) A movable element mounted on said frame for movement between first and second positions; and, (C) A body of ferromagnetic material in said frame in an area through which said magnetic field passes and carried by said movable element for moving said movable element from said first position to said second position responsive to inductive coupling of said coil and body upon generation of said magnetic field.

References Cited

UNITED STATES PATENTS

| | | | |
|---|---|---|---|
| 1,817,079 | 8/1931 | Hall | 179—84 |
| 2,066,434 | 1/1937 | Treworgy | 179—84 |

KATHLEEN H. CLAFFY, Primary Examiner

JAN S. BLACK, Assistant Examiner